(12) United States Patent
Neufeld et al.

(10) Patent No.: US 10,631,028 B2
(45) Date of Patent: Apr. 21, 2020

(54) DELIVERY OF THIRD PARTY CONTENT ON A FIRST PARTY PORTAL

(71) Applicant: SONY INTERACTIVE ENTERTAINMENT LLC, San Mateo, CA (US)

(72) Inventors: Travis John Neufeld, Berkeley, CA (US); Charles Arthur Pierce, Suisun City, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 0 days.

(21) Appl. No.: 15/383,234

(22) Filed: Dec. 19, 2016

(65) Prior Publication Data

US 2018/0176612 A1 Jun. 21, 2018

(51) Int. Cl.
*H04N 21/2385* (2011.01)
*H04N 21/258* (2011.01)
(Continued)

(52) U.S. Cl.
CPC ..... *H04N 21/2385* (2013.01); *H04L 65/4076* (2013.01); *H04L 65/4084* (2013.01);
(Continued)

(58) Field of Classification Search
CPC ......... H04N 21/4788; H04N 21/47202; H04N 21/2187; H04N 21/00; H04N 21/26283; H04N 21/4383; H04N 21/252; H04N 21/4781; H04N 7/17336; H04N 21/2385; H04N 21/2396; H04N 21/2668; H04N 21/2665; H04N 21/25875; H04N 21/6125;
(Continued)

(56) References Cited

U.S. PATENT DOCUMENTS 7,483,871 B2  1/2009  Herz
9,094,738 B2  7/2015  Kishore
(Continued)

FOREIGN PATENT DOCUMENTS

| WO | WO 2018/118267 | 6/2018 |
| WO | WO 2018/125392 | 7/2018 |
| WO | WO 2018/128713 | 7/2018 |

OTHER PUBLICATIONS

PCT/US17/61185, Network-Based Previews, Nov. 10, 2017.
(Continued)

*Primary Examiner* — Mulugeta Mengesha
*Assistant Examiner* — Alazar Tilahun
(74) *Attorney, Agent, or Firm* — Polsinelli LLP (57) ABSTRACT

The systems and methods are directed towards delivery of third party content onto a user device having a first party portal. The first party portal service facilitates the user viewing of third party content on the user device. In particular, the first party portal service retrieves third party content (e.g., video content streams) from third party content providers and provides the third party content in a format (i.e. channels) that allows users to easily view different types of content. Furthermore, the first party portal service facilitates the user in viewing the third party content alongside other existing channels available to cable television and streaming media/video on demand content.

19 Claims, 5 Drawing Sheets

(51) Int. Cl.

| | | |
|---|---|---|
| *H04N 21/43* | (2011.01) | |
| *H04N 21/2547* | (2011.01) | |
| *H04N 21/4788* | (2011.01) | |
| *H04L 29/08* | (2006.01) | |
| *H04N 21/81* | (2011.01) | |
| *H04N 21/61* | (2011.01) | |
| *H04L 29/06* | (2006.01) | |
| *H04N 21/472* | (2011.01) | |
| *H04N 21/2668* | (2011.01) | |
| *H04N 21/2665* | (2011.01) | |
| *H04N 21/239* | (2011.01) | |

(52) U.S. Cl.
CPC ............. *H04L 67/02* (2013.01); *H04L 67/20* (2013.01); *H04L 67/42* (2013.01); *H04N 21/2396* (2013.01); *H04N 21/2547* (2013.01); *H04N 21/25875* (2013.01); *H04N 21/2665* (2013.01); *H04N 21/2668* (2013.01); *H04N 21/47202* (2013.01); *H04N 21/6125* (2013.01); *H04N 21/812* (2013.01); *H04N 21/8133* (2013.01)

(58) Field of Classification Search
CPC ............. H04N 21/812; H04N 21/2547; H04N 21/8133; H04L 67/02; H04L 67/42; H04L 67/20; H04L 65/4084; H04L 65/4076
See application file for complete search history.

(56) References Cited

U.S. PATENT DOCUMENTS

| | | | |
|---|---|---|---|
| 9,098,572 B1 | 8/2015 | Reilly et al. | |
| 9,418,388 B1* | 8/2016 | Young | G06F 3/04847 |
| 9,569,624 B1* | 2/2017 | Nijim | G06F 21/60 |
| 9,715,901 B1 | 7/2017 | Singh et al. | |
| 10,366,132 B2 | 7/2019 | Jiron | |
| 10,419,384 B2 | 9/2019 | Gross | |
| 2002/0040374 A1 | 4/2002 | Kent | |
| 2004/0059705 A1 | 3/2004 | Wittke et al. | |
| 2005/0033657 A1 | 2/2005 | Herrington et al. | |
| 2005/0071328 A1 | 3/2005 | Lawrence | |
| 2007/0130602 A1 | 6/2007 | Gulli et al. | |
| 2007/0143493 A1 | 6/2007 | Mullig et al. | |
| 2007/0157234 A1* | 7/2007 | Walker | H04N 5/44543 725/38 |
| 2009/0150784 A1 | 6/2009 | Denney et al. | |
| 2009/0228774 A1 | 9/2009 | Matheny et al. | |
| 2009/0249244 A1* | 10/2009 | Robinson | G06F 3/0481 715/781 |
| 2010/0123830 A1 | 5/2010 | Vunic | |
| 2010/0153848 A1 | 6/2010 | Saha | |
| 2011/0022549 A1 | 1/2011 | Zhuang et al. | |
| 2011/0107382 A1 | 5/2011 | Morris et al. | |
| 2012/0191692 A1 | 7/2012 | Wang | |
| 2013/0080895 A1 | 3/2013 | Rossman et al. | |
| 2013/0086159 A1 | 4/2013 | Gharachorloo et al. | |
| 2013/0097159 A1 | 4/2013 | Park et al. | |
| 2013/0117781 A1* | 5/2013 | Kim | H04N 21/431 725/32 |
| 2016/0070962 A1 | 3/2016 | Shetty et al. | |
| 2016/0105734 A1 | 4/2016 | Packard et al. | |
| 2016/0140227 A1 | 5/2016 | Lymberopoulos et al. | |
| 2016/0381111 A1 | 12/2016 | Barnett et al. | |
| 2018/0018972 A1* | 1/2018 | Ensor | G10L 17/22 |
| 2018/0132011 A1 | 5/2018 | Shichman et al. | |
| 2018/0181661 A1 | 6/2018 | Jiron | |
| 2018/0199102 A1 | 7/2018 | Gross | |

OTHER PUBLICATIONS

PCT/US17/61189, Delivery of Third Party Content on a First Party Portal, Nov. 10, 2017.
PCT/US17/61149, Delivering Customized Content Using a First Party Portal Service, Nov. 10, 2017.
U.S. Appl. No. 15/400,944, Michael Gross, Network-Based Previews, filed Jan. 6, 2017.
U.S. Appl. No. 15/392,237, Joey Jiron, Delivering Customized Content Using a First Party Portal Service, filed Dec. 28, 2016.
PCT Application No. PCT/US2017/061149 International Search Report and Written Opinion dated Feb. 1, 2018.
PCT Application No. PCT/US2017/061185 International Search Report and Written Opinion dated Feb. 1, 2018.
PCT Application No. PCT/US2017/061189 International Search Report and Written Opinion dated Jan. 30, 2018.
U.S. Appl. No. 15/400,944 Office Action dated Jan. 26, 2018.
U.S. Appl. No. 15/400,944 Final Office Action dated Jan. 26, 2018.
U.S. Appl. No. 15/392,237 Office Action dated Sep. 10, 2018.
U.S. Appl. No. 15/400,944 Office Action dated Dec. 31, 2018.
U.S. Appl. No. 15/400,944 Final Office Action dated Aug. 3, 2018.
U.S. Appl. No. 16/525,092, Joey Jiron, Delivering Customized Content, filed Jul. 29, 2019.
U.S. Appl. No. 16/573,546, Michael Gross, Metrics-Based Timeline of Previews, filed Sep. 17, 2019.
PCT Application No. PCT/US2017/061149 International Preliminary Report on Patentability dated Jul. 2, 2019.

* cited by examiner

DELIVERY OF THIRD PARTY CONTENT ON A FIRST PARTY PORTAL

BACKGROUND

Field of Invention

The present invention generally relates to delivery of third party content to a user device. More specifically, the present invention relates to delivery of third party content on a first party portal.

Description of the Related Art

Cable television delivers television programming to paying subscribers. The television programming is provided to the subscribers from one of many existing providers (e.g., DirecTV, Verizon, AT&T U-verse). By paying a subscription, subscribers are provided access (from a provider) to "cable channels" such as HBO, MTV, Cartoon Network. In some cases, users could buy one or more channels as desired. In other cases, users would need to purchase two or more channels at one time via a bundle.

In addition to cable television, there also exist services that allow users to view streaming media and video on demand content on various computing devices (e.g., mobile device, laptop, desktop). These services (e.g., Netflix, Hulu, Amazon Fire TV) may allow users to not only view television programming (similar to what is offered via cable television) but may include additional content such as movies and original online content.

Presently, there is another category of content (i.e. video content) that is currently not incorporated in either cable television or streaming media/video on demand services. This category includes various different types of video content generated and streamed by individuals (referred also as third party content). For example, an example third party content provider is Twitch.tv which allows users (i.e. broadcasters, streamers) to generate and provide streaming video content to a live audience using the third party content provider website. With the example of Twitch, the broadcasters stream video content primarily focusing on video games.

The video content available on Twitch can be categorized into many different channels. For example, the content can be categorized into various channels based on type of content (e.g., particular game or game title) or broadcaster/streamer. The content includes both the streaming video content as well as recordings of the streaming video content.

This category of live streaming video content has gained tremendous popularity over the recent years. For example, Twitch.tv was reported has having 45 million unique viewers back in October 2013. Furthermore, in February 2014, Twitch.tv was reported as being the fourth largest source of peak internet traffic. In 2015, Twitch announced that it has over 1.5 million broadcasters (users streaming video content using the site) and 100 million visitors per month.

With the existing services associated with cable television and streaming media/video on demand, various functionalities have been implemented that facilitate user ease in viewing the content. For example, users are provided the ability to switch between different content (i.e. channels) thereby browsing numerous channels without the need to open or use alternative programs or applications. Users are also able to save (i.e. favorite) one or more channels that are frequently viewed.

No such functionality is currently available with respect to the third party content. Users would need to navigate, for example, through browser interfaces or opening new applications/programs in order to search for different individual streams to view. The searching via existing methods, when taking into account the numerous different game titles and broadcasters available, is not only time consuming but would also prevent users from easily viewing the full scope of what's available via the third party content provider (i.e. Twitch). There is a need to provide similar functionality (i.e. channels) for the viewing of third party content that is already implemented with cable television and streaming media/video on demand so that the viewing audience could more efficiently and effectively view what is available.

SUMMARY OF THE CLAIMED INVENTION

A method for integrating third party content streams for viewing on a user device is presently claimed. The method covers the features whereby third party content is provided to the user on the user device in a channel format, similar to how existing content is provided via cable, streaming media or video on demand services. The method includes a request to view third-party content streams on a user device having a first party portal. The request is used to identify the source of the requested third party content streams, via assistance of the first party portal service. The user device and the third party content provider establish a communication channel that facilitates the delivery of information related to the requested third party content stream to the user device. The first party portal service then extracts metadata from the delivered information which includes 1) descriptive information and 2) format-based information. The descriptive information is mapped according to pre-determined categories of information that can be displayed alongside the video content stream on the user device. The format-based information dictates how the video content stream should be converted in order to be compatible with the user device and/or first party portal service. Once the conversion is complete, the third party content stream and descriptive information is displayed on the user device for the user to view.

A system for integrating third party content streams for viewing on a user device is also presently claimed. The system includes one or more host devices that host content (inclusive of third party content streams) that may be viewable by a user on their respective user devices (i.e. client devices). The system also includes a server associated with a first party portal service that provides information (i.e. instructions) used to establish communication between the client device and the host devices. Lastly, the system includes the client devices from which the users are requesting to view third party content streams. These client devices are compatible with the first party portal service and perform various steps to retrieve the content from the host device and display that content for the user to view on the client device. The client device first receives a request to view third-party content streams. The request is used to identify the source of the requested third party content streams, via assistance of the first party portal service. The client device and the host device establish a communication channel that facilitates the delivery of information related to the requested third party content stream to the client device. The first party portal service then extracts metadata from the delivered information which includes 1) descriptive information and 2) format-based information. The descriptive information is mapped according to pre-determined categories of information that can be displayed alongside the video content stream on the client device. The format-based information dictates how the video content stream should be converted in order to be compatible with the client device and/or first party portal service. Once the conversion is complete, the third party content stream and descriptive information is displayed on the client device for the user to view.

A non-transitory computer-readable storage medium that includes a program that is executable by a processor to perform a method for integrating third party content streams for viewing on a user device is also presently claimed. The method executed by the processor covers the features whereby third party content is provided to the user on the user device in a channel format, similar to how existing content is provided via cable, streaming media or video on demand services. The method includes a request to view third-party content streams on a user device having a first party portal service. The request is used to identify the source of the requested third party content streams, via assistance of the first party portal service. The user device and the third party content provider establish a communication channel that facilitates the delivery of information related to the requested third party content stream to the user device. The first party portal service then extracts metadata from the delivered information which includes 1) descriptive information and 2) format-based information. The descriptive information is mapped according to pre-determined categories of information that can be displayed alongside the video content stream on the user device. The format-based information dictates how the video content stream should be converted in order to be compatible with the user device and/or first party portal. Once the conversion is complete, the third party content stream and descriptive information is displayed on the user device for the user to view.

DETAILED DESCRIPTION

The present disclosure describes how third party content can be delivered to a user device having a first party portal. The first party portal service facilitates the user viewing of third party content on the user device. In particular, the first party portal service retrieves third party content (e.g., video content streams) from third party content providers (e.g., Twitch) and provides them in a format (i.e. channels) that allows users to easily view different content on their user device. Furthermore, the first party portal service facilitates the user in viewing the third party content alongside other existing channels available to cable television and streaming media/video on demand content. The first party portal service thereby provides the user the option to utilize a single device for viewing a variety of different content types without the need to utilize multiple applications, interfaces, or services.

In the past, "channels" referred to a band of frequencies used in radio and television transmission. These "channels" would be associated with a particular station that provides content. Some exemplary cable channels include HBO, MTV and Cartoon Network. As used herein, a "channel" refers to a collection of programs (i.e. content that a user can view). Each of these channels may have one or more different programs (i.e. shows, movies) that a user can view.

With the characteristic of being a channel, users (such as with cable television) are able to view (e.g., search, scan) numerous different channels quickly using the same interface/application. In other words, users would not need to open different applications or interfaces to view content coming from different sources. Furthermore, users are capable of performing various other functionalities that facilitate the viewing of a variety of different content without the need to utilize multiple applications, interfaces or services (e.g., picture-in-picture, flashback, bookmarking).

Figure 1A:
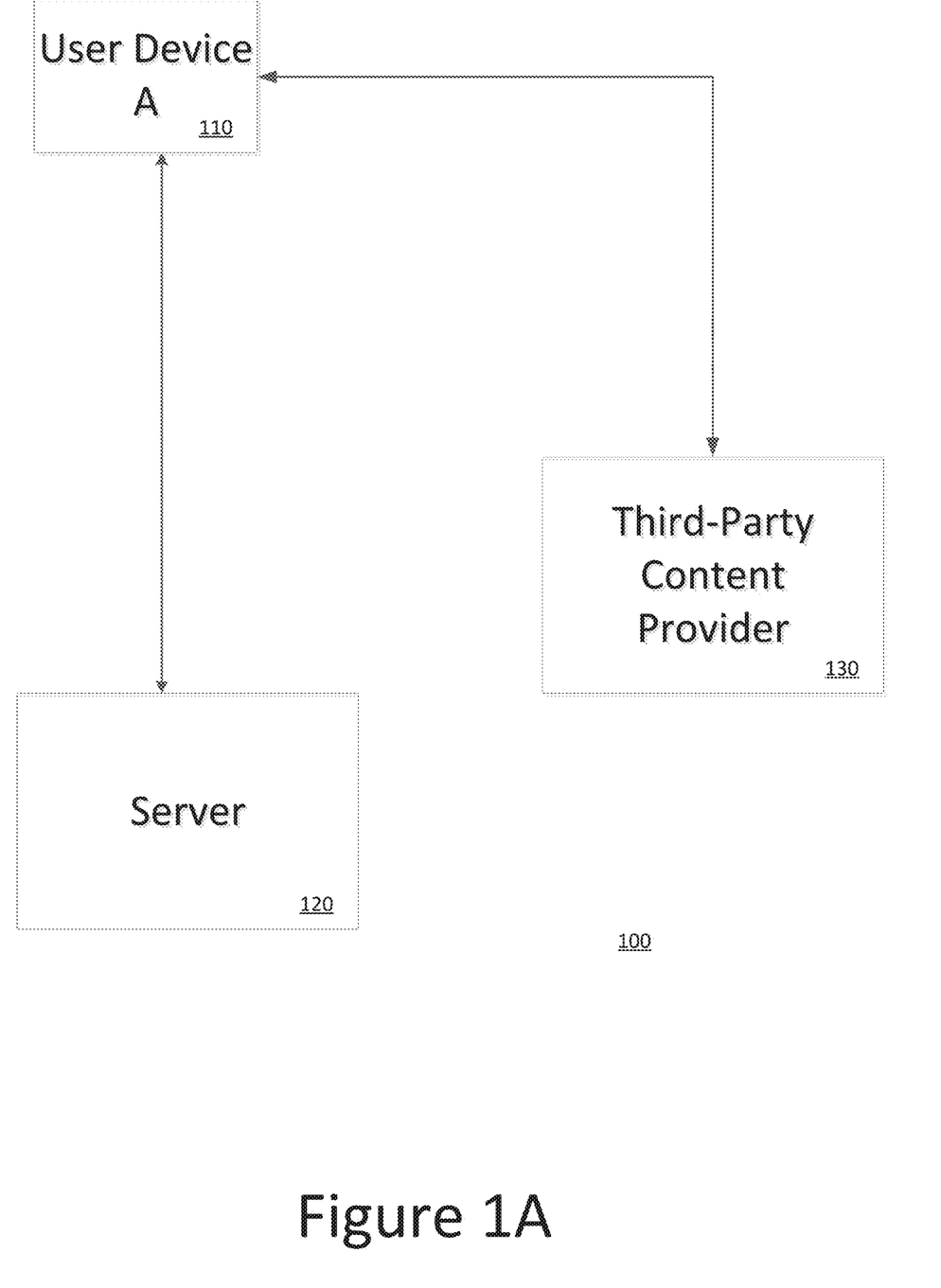
FIG. 1A and FIG. 1B illustrate exemplary systems for implementing the delivery of third party content to a user device associated with a first party portal service.
Figure 1B:
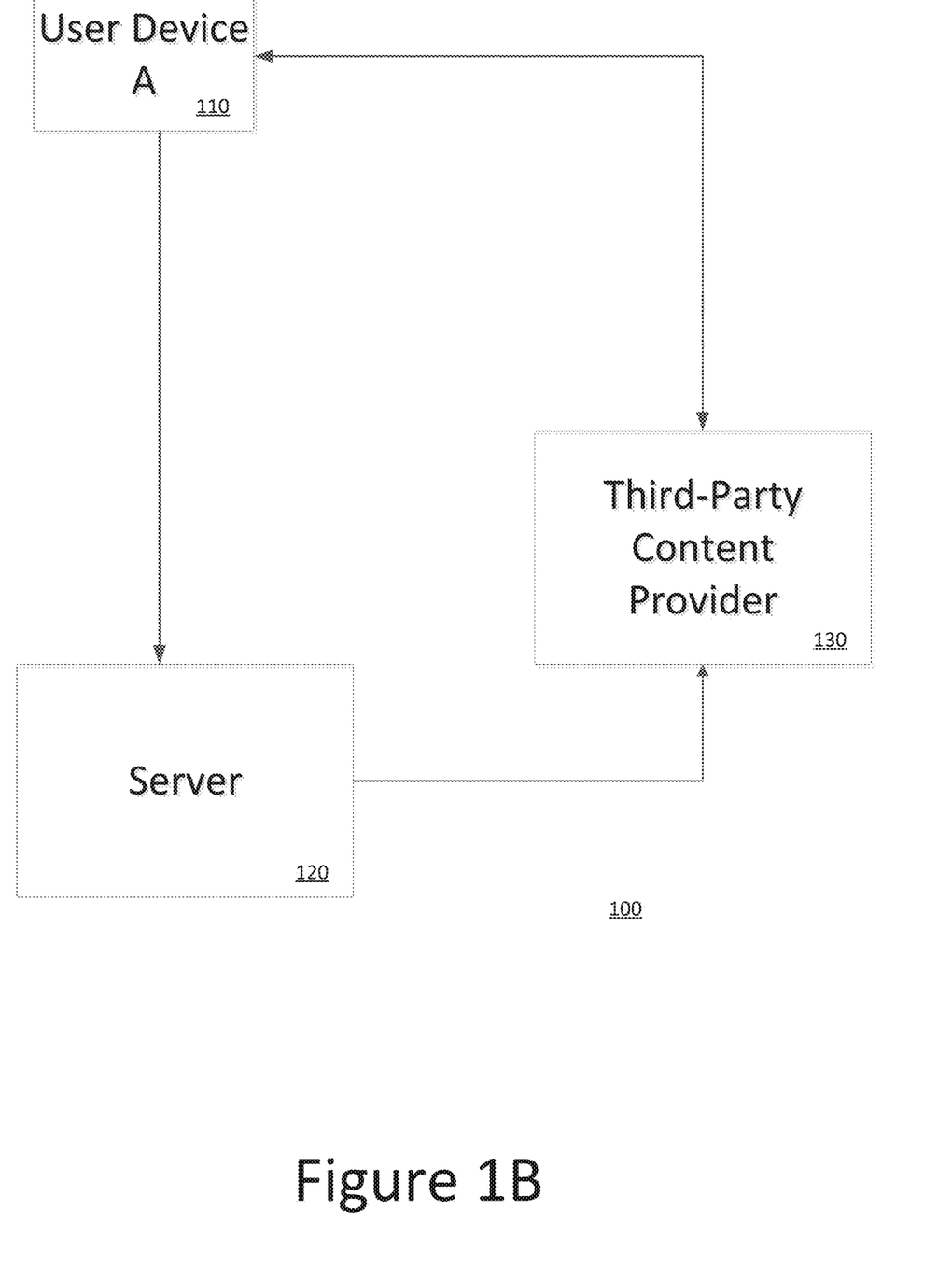

FIG. 1A and FIG. 1B illustrate exemplary systems 100 for implementing the delivery of third party content to a user device associated with a first party portal service 110. In both the figures, the system 100 includes the user device (i.e. client device) 110 associated with the first party portal service, a server 120 that carries out the functionalities of the first party portal service, and at least one third-party content provider 130. In other embodiments, there may be numerous different user devices, servers and third-party content providers present.

As used herein, the first party portal refers to an application that facilitates 1) the retrieval and 2) display of content (e.g., streaming media) on the user device. The first party portal service instructions may be stored and executed on the user device 110. The functionalities associated with the first party portal service may be pre-installed on the user device 110 or provided by the server 120 as needed.

The server 120 provides a variety of different types of instructions/software or applications that carry out the processes involved with retrieving and displaying content on the user device. For example, the server 120 may include instructions for the user device associated with the first party portal service that dictates 1) where the user device should go in order to obtain a particular type of content (i.e. third party content), 2) how the user device can retrieve the content from a content provider, 3) how to format the retrieved content for compatibility with the first party portal service and the user device, and 4) how to display the content on the user device.

The user device 110 (i.e. client device) can refer to any number of different computing devices. For example, the user device 110 may be a gaming console, mobile device, laptop, or desktop. These exemplary user devices 110 may have many different characteristics such as using different operating systems (e.g., iOS, Android), applications or computing languages (e.g., C++, JavaScript). Details regarding exemplary user devices 110 are provided below with reference to FIG. 2. It should be noted that the first party portal service may include different instructions for different computing devices based on the different characteristics.

The server 120 corresponds to one or more computing devices that facilitate operation of the first party portal service associated with the user device 110. The server 120 may operate as a cloud-based computing model that uses a network of different computing devices hosted on the Internet to store, manage and process the data for the first party portal. The server 120 may communicate with the user device 110 (via the Internet) on a regular basis in order to provide the necessary instructions and applications used by the first party portal to carry out its various functionalities. Further details regarding the server 120 are provided below with respect to FIG. 3.

The third-party content provider 130 includes any number of different sources (i.e. hosts) of third party content available on the Internet. As described above, example third party content includes video content streams generated by individuals (i.e. broadcasters, streamers) that may be viewed by any number of different viewers simultaneously. These video content streams may be hosted using a particular website associated with the third party content provider (e.g., Youtube, Twitch, and Vine).

The system 100 may also access existing streaming media and/or video on demand as well (not shown). The existing streaming media and/or video on demand may be associated with their respective content providers (e.g., HBO, Cartoon Network, MTV).

The exemplary system 100 as illustrated in FIG. 1A and FIG. 1B describe two different possible modes of operation. In a first embodiment (as illustrated in FIG. 1A), the user device 110 may initially communicate with the server 120 to obtain information about third party video content that the user would like to view. The information may include where (i.e. host website) the third party video content is hosted. Once information is obtained, the user device 110 may subsequently initiate communications directly with the third party content provider 130 in order to obtain the third party video content. Further details regarding this embodiment are provided below (see FIG. 4).

In an alternative embodiment (as illustrated in FIG. 1B), the user device 110 can still initially communicate with the server 120 regarding third party video content that the user would like to view. However, instead of the server 120 providing the information about where the third party video content is hosted, the server 120 can instead reach out directly to the third party content provider 130. More specifically, the server 120 can instruct the third party content provider 130 to initiate communications with the user device 110 in connection with the user request to view third party video content hosted by the third party content provider 130.

In situations where there are numerous user devices 110 all communicating with the server 120 simultaneously, the embodiment illustrated in FIG. 1A may be chosen. Since each of the user devices 110 initiate communications with the third party content providers 130 separately, this avoids overloading the server 120 with too many requests from numerous different user devices 110 as the server 120 may not be capable of initiating all the communications requests from the various user devices 110.

In an alternate situation, the embodiment illustrated in FIG. 1B may be chosen where fewer user devices 110 are simultaneously communicating with the server 120 regarding third party video content. By having the server 120 initiate connections between the user device 110 and the third party content provider 130, the amount of network traffic can be reduced as less communications are needed to establish connection between the user device 110 and the third party content provider 130. In this way, this embodiment may facilitate the retrieval of third party video content to the user device 110 from the third party content provider 130 more quickly than compared to the embodiment illustrated in FIG. 1A.

As described above, each of the embodiments for the system 100 illustrated in FIG. 1A and FIG. 1B may have their respective benefits for operating in a particular manner based on the situation. As such, there may be systems where the two different embodiments are also interchangeable based on, for example, the number of requests being provided to the server during a given time period.

Figure 2:
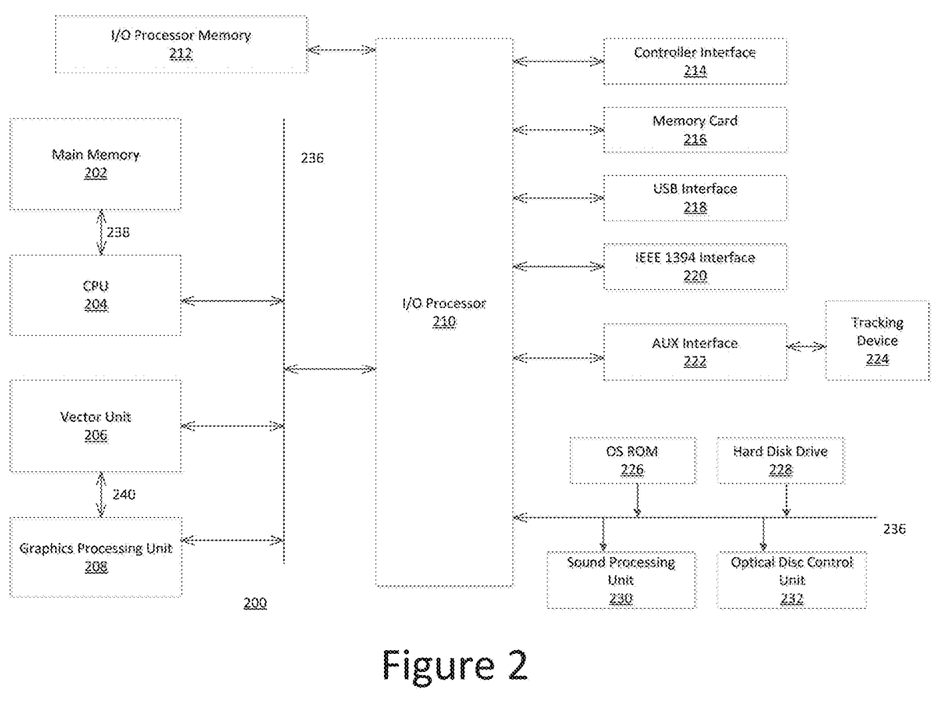
FIG. 2 is an exemplary user device associated with the first party portal service.

FIG. 2 is an exemplary user device associated with the first party portal service 200. The exemplary user device 200 (e.g., desktop, laptop, tablet, mobile device, console gaming system) is a computing device that the user can utilize to facilitate carrying out features of the present invention pertaining to the viewing of third party content.

The user device associated with the first party portal service 200 may include various elements as illustrated in FIG. 2. It should be noted that the elements are exemplary and that other embodiments may incorporate more or less than the elements illustrated. With reference to FIG. 2, the user device associated with the first party portal service 200 includes a main memory 202, a central processing unit (CPU) 204, at least one vector unit 206, a graphics processing unit 208, an input/output (I/O) processor 210, an I/O processor memory 212, a controller interface 214, a memory card 216, a Universal Serial Bus (USB) interface 218, and an IEEE 1394 interface 220, an auxiliary (AUX) interface 222 for connecting a tracking device 224, although other bus standards and interfaces may be utilized. The user device associated with the first party portal service 200 further includes an operating system read-only memory (OS ROM) 226, a sound processing unit 228, an optical disc control unit 230, and a hard disc drive 232, which are connected via a bus 234 to the I/O processor 210. The user device associated with the first party portal service 200 further includes at least one tracking device 224.

The tracking device 224 may be a camera, which includes eye-tracking capabilities. The camera may be integrated into or attached as a peripheral device to user device associated with the first party portal service 200. In typical eye-tracking devices, infrared non-collimated light is reflected from the eye and sensed by a camera or optical sensor. The information is then analyzed to extract eye rotation from changes in reflections. Camera-based trackers focus on one or both eyes and record their movement as the viewer looks at some type of stimulus. Camera-based eye trackers use the center of the pupil and light to create corneal reflections (CRs). The vector between the pupil center and the CR can be used to compute the point of regard on surface or the gaze direction. A simple calibration procedure of the viewer is usually needed before using the eye tracker.

Alternatively, more sensitive trackers use reflections from the front of the cornea and that back of the lens of the eye as features to track over time. Even more sensitive trackers image features from inside the eye, including retinal blood vessels, and follow these features as the eye rotates.

Most eye tracking devices use a sampling rate of at least 30 Hz, although 50/60 Hz is most common. Some tracking devises run as high as 1250 Hz, which is needed to capture detail of very rapid eye movement.

A range camera may instead be used with the present invention to capture gestures made by the user and is capable of facial recognition. A range camera is typically used to capture and interpret specific gestures, which allows a hands-free control of an entertainment system. This technology may use an infrared projector, a camera, a depth sensor, and a microchip to track the movement of objects and individuals in three dimensions. This user device may also employ a variant of image-based three-dimensional reconstruction.

The tracking device 224 may include a microphone integrated into or attached as a peripheral device to the user device associated with the first party portal service 200 that captures voice data. The microphone may conduct acoustic source localization and/or ambient noise suppression.

Alternatively, tracking device 224 may be the controller of the user device associated with the first party portal service 200. The controller may use a combination of built-in accelerometers and infrared detection to sense its position in 3D space when pointed at the LEDs in a sensor nearby, attached to, or integrated into the console of the entertainment system. This design allows users to control functionalities of the user device associated with the first party portal service 200 with physical gestures as well as button-presses. The controller connects to the user device associated with the first party portal service 200 using wireless technology that allows data exchange over short distances (e.g., 30 feet). The controller may additionally include a "rumble" feature (i.e., a shaking of the controller during certain points in the game) and/or an internal speaker.

The controller may additionally or alternatively be designed to capture biometric readings using sensors in the remote to record data including, for example, skin moisture, heart rhythm, and muscle movement.

As noted above, the user device associated with the first party portal service 200 may be an electronic gaming console. Alternatively, the user device associated with the first party portal service 200 may be implemented as a general-purpose computer, a set-top box, or a hand-held gaming device. Further, similar user devices may contain more or less operating components.

The CPU 204, the vector unit 206, the graphics processing unit 208, and the I/O processor 210 communicate via a system bus 236. Further, the CPU 204 communicates with the main memory 202 via a dedicated bus 238, while the vector unit 206 and the graphics processing unit 208 may communicate through a dedicated bus 240. The CPU 204 executes programs stored in the OS ROM 226 and the main memory 202. The main memory 202 may contain pre-stored programs and programs transferred through the I/O Processor 210 from a CD-ROM, DVD-ROM, or other optical disc (not shown) using the optical disc control unit 232. The I/O processor 210 primarily controls data exchanges between the various devices of the user device associated with the first party portal service 200 including the CPU 204, the vector unit 206, the graphics processing unit 208, and the controller interface 214.

The graphics processing unit 208 executes graphics instructions received from the CPU 204 and the vector unit 206 to produce images for display on a display device (not shown). For example, the vector unit 206 may transform objects from three-dimensional coordinates to two-dimensional coordinates, and send the two-dimensional coordinates to the graphics processing unit 208. Furthermore, the sound processing unit 230 executes instructions to produce sound signals that are outputted to an audio device such as speakers (not shown).

A user of the user device associated with the first party portal service 200 provides instructions via the controller interface 214 to the CPU 204. For example, the user may instruct the CPU 204 to store certain information on the memory card 216 or instruct the user device 200 to perform some specified action.

Other devices may be connected to the user device associated with the first party portal service 200 via the USB interface 218, the IEEE 1394 interface 220, and the AUX interface 222. Specifically, a tracking device 224, including a camera or a sensor may be connected to the user device associated with the first party portal service 200 via the AUX interface 222, while a controller may be connected via the USB interface 218.

Figure 3:
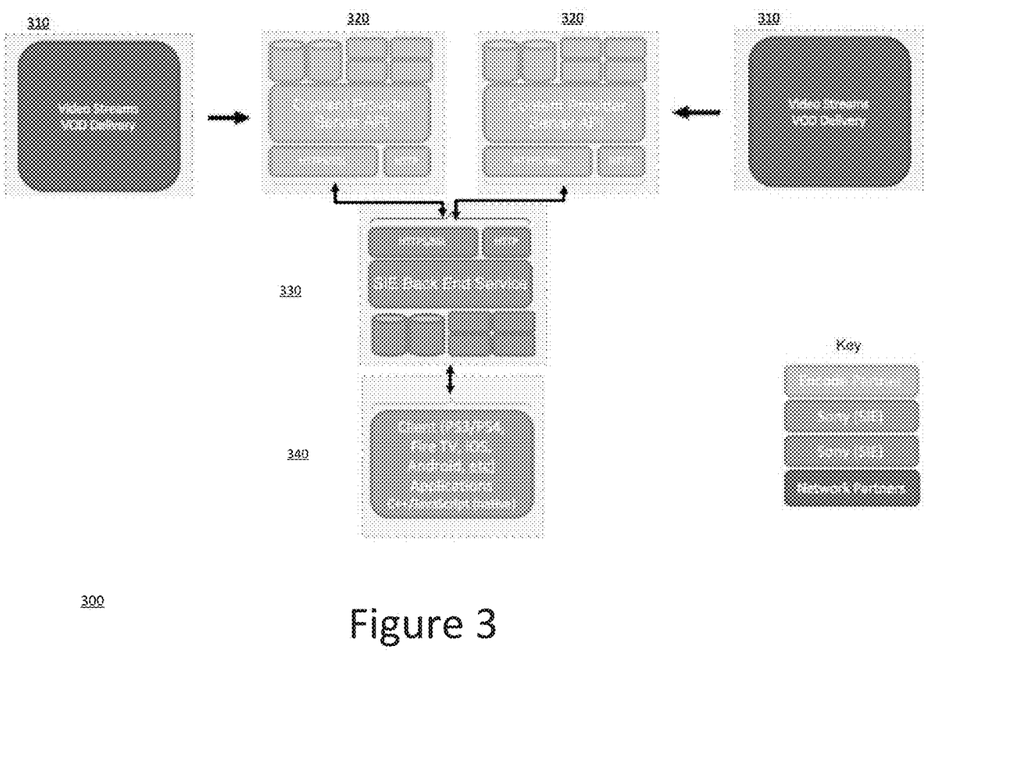
FIG. 3 is an exemplary first party portal service.

FIG. 3 is an exemplary first party portal service 300. The first party portal service 300 includes a plurality of different elements that collectively work together in order to deliver content from a variety of different video content sources 310 for the user to view on the client device (i.e. user device) 340.

The first party portal service 300 can obtain video content from a variety of different video content sources 310. For example, the first party portal service 300 can access existing streaming media and/or video on demand (e.g., movies, television shows, online shows) in a similar manner as other existing services such as Netflix and Hulu. Furthermore, the first party portal service 300 can also access third party video content from various third party content providers (e.g., Twitch, Youtube, Vine). Such third party content presently is not accessible via existing services such as Netflix and Hulu.

The Content Provider Server API (Application Program Interface) 320 provides instructions usable by the client device 340 associated with the first party platform service regarding how to access content (e.g., streaming media, video on demand, third party content) from the different video content sources 310. Additional information, such as metadata, about the accessed content can also be provided by the Content Provider Server API 320 to the client device 340. As described below, the additional information (i.e. metadata) can be usable to provide details about the content being shown to the user on the client device 340. Finally, additional services associated with the accessed content such as chat services, ratings and profiles can also be provided from the video content sources 310 to the user device 340 via the Content Provider Server API 320.

The Content Provider Server API 320 may be provided by each of the one or more video content sources (i.e. third-party content provider) 310. The Content Provider Server API 320 facilitates access of each of the client devices 340 to the content hosted by the third party content providers 310. This may mean that with each unique source of content 310, there may be a unique Content Provider Server API 320 that would facilitate the client device 340 in accessing the content hosted by that content source 310. There may be embodiments where Content Provider Server APIs 320 are shared between two or more sources of content 310 where requirements for access of the content by the client device 150 are similar.

The Content Provider Server API 320 is accessed by a backend service layer 330 in order to obtain information about available content for the client device 340. As described below, the additional information about the content may include metadata (e.g., author, title, genre) describing the available content. The information may also include a location where the content is stored (e.g., URL) so that the user device can proceed with retrieving the content from the content source 310. Furthermore, the Content Provider Server API 320 may include instructions for implementing functionalities such as chat that would allow different users simultaneously viewing the same content to interact with each other in real time. Such instructions are used by the backend service layer 330 to carry out the functionalities on the client device 340.

As illustrated in the figure, the first party portal service 300 also includes a back end service 330 that carries out the first party portal services for the client device 340. The backend service 330 is responsible for communicating with the different content sources 310 that have available content for the user to view and perform processes to have that content available to the user on the client device 340. The backend service 330 would carry out instructions, for example, that would facilitate identifying formats of the content and subsequently formatting the content from these different content sources 310 so that they are usable by the client device 340. This may include identifying the metadata associated with each of the content then using various different types of conversion techniques so that data stored in one format with respect to the content sources 310 can be rendered and displayed on the client devices 340, which may correspond to a second format.

As indicated above, the first party portal service 300 is compatible with any number of different client devices 340. This compatibility with each different type of client device 340 can be implemented using the backend services 330. The client device 340 (i.e. the user device) can include a plurality of different computing devices. For example, the client device 340 may include any number of different gaming consoles, mobile devices, laptops, and desktops. These client devices 340 may also run using a variety of different operating systems (e.g., iOS, Android), applications or computing languages (e.g., C++, JavaScript). Details regarding exemplary client devices 340 have been provided above with respect to FIG. 2.

Figure 4:
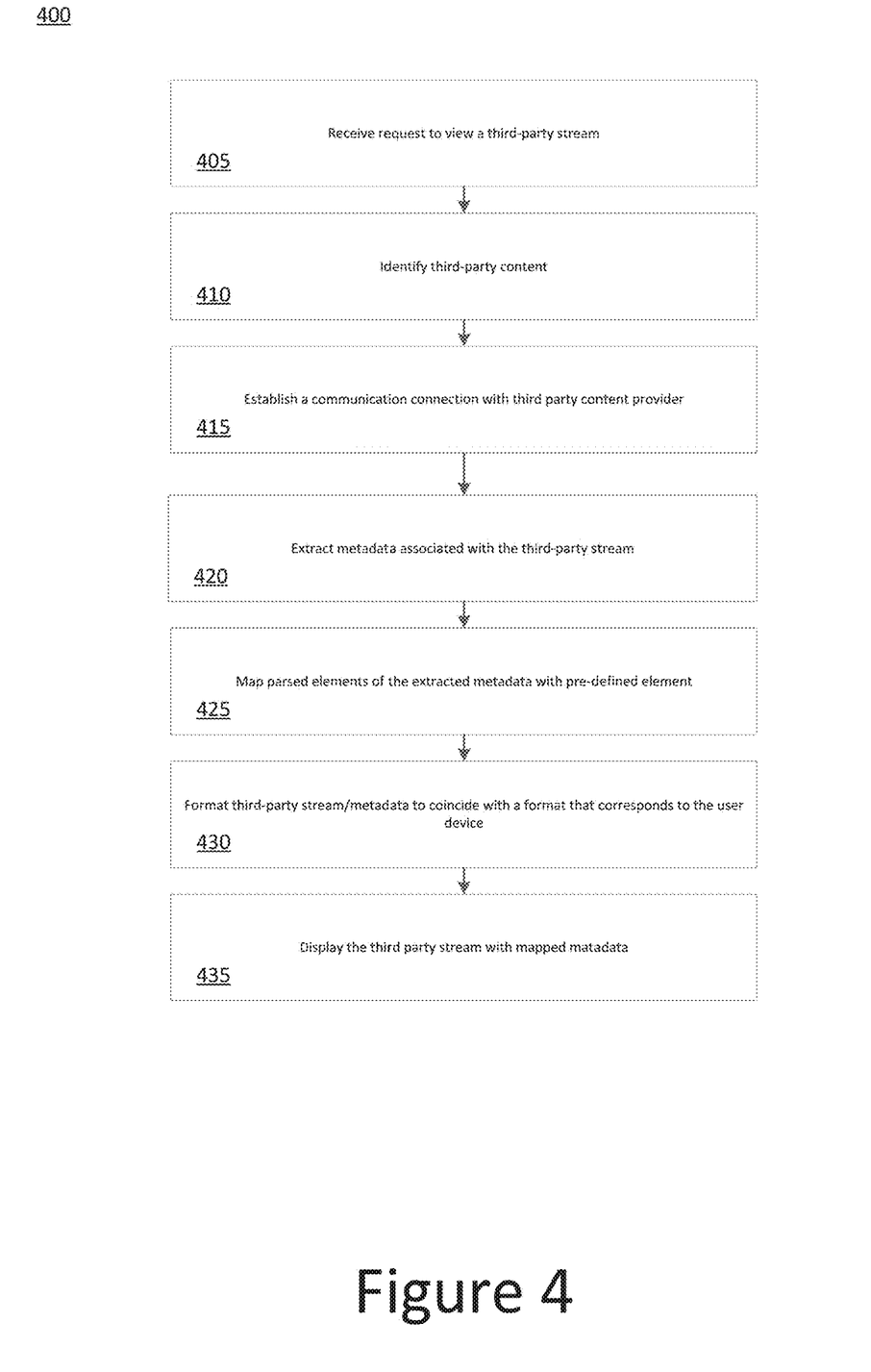
FIG. 4 illustrates an exemplary method of the first party portal service.

FIG. 4 illustrates an exemplary method 400 for implementing the delivery of third party content to the user device through the use of the first party portal service. In an embodiment, the exemplary method 400 would be used to facilitate the user in viewing a particular video content stream from the third party content provider on the user device. It should be noted that the exemplary method 400 could also be used to facilitate the user viewing of any type of content (e.g., streaming media, video on demand) on the user device. In some embodiments, the method 400 illustrated in the figure is implemented via the backend service associated with the first party portal service (see FIG. 3).

In step 405, the user (via a user interface associated with the user device) can transmit a request from the user device to the server requesting to view streaming video content from a particular third party content provider. This request can be provided via the user interface (e.g., search engine, text box) associated with the first party platform. For example, the user may provide a type of third party content they would like to view using one or more descriptions (e.g., type of content, author, title of stream).

In other embodiments, the user view request can instead be resolved at the user device itself. For example, the server may have provided various instructions, applications or search-related information (e.g., location-based information of the third party content providers) to the user device at a previous time (e.g., during initiation of the user device) or may provide such information on a regular basis to the user device. Using the information from the server, the user device can process the user view request if the information is available on the user device. If the information provided beforehand is not available, this may trigger the request to be transmitted to the server for processing.

Once the user viewing request is received, information regarding the request is obtained. This information may include looking up where (i.e. location on the Internet) where the third party content provider associated with the third party content is located. This information may available in a database, stored on the server and/or the user device. In situations where the user device does not have this information readily available, this information is returned from the server to the user device to facilitate user device's retrieval of the third party content from the third part content provider.

Once the location of the third party content provider is obtained, the user device begins locating where the requested third party content (i.e. video content stream) in step 410. As noted above, the user viewing request can include descriptive information that can identify one or more related video content streams that the user may wish to view. Such information may include the name of the video content stream, the subject matter (i.e. game or game title) of the video content streams that the user would like to view, or one or more authors (i.e. broadcaster/streamer) associated with a subject matter that the user would like to view. This information can be provided from the user device to a particular video content provider via the back end service (see FIG. 3) in order to identify one or more streams that the user may want to view related to the user request.

Once one or more related video content streams have been located, the user device and the third party content provider can establish a communication channel in step 415. The communication channel will allow the user device to retrieve information (e.g., video content stream, metadata) from the third party content provider (i.e. website) that will subsequently be displayed on the user device. This communication channel may include a variety of security features (e.g., user accounts, password, encryption) to ensure that 1) legitimate user devices are accessing the third party video content and 2) the information being transmitted between the user device and the third party content provider is not tampered with by outside parties.

In some embodiments, the user device may first establish a communication channel with a particular third party content provider prior to providing the descriptive information from the viewing request used to identify relevant third party video content (i.e. third party content stream, video on demand) that the user would like to view. The third party content provider can subsequently transmit the related third party content streams based on the descriptive information provided by the user. The more descriptive the user request is, the more likely the third party content provider can provide a particular third party content stream (if applicable).

Once one or more related third party content streams have been identified based on the user request, the third party content provider can transmit information to the user device related to the third party video content streams. The user device (in step 420) can proceed with identifying and extracting the metadata associated with the transmitted third party video content streams via the use of the backend service.

Metadata is described as being data that provides information about other data (i.e. the video content stream). In this case, the metadata may describe what the subject matter of the video content stream is, the author(s) of the video content stream, when the video content stream was created, how long the video content stream is, location where the video content stream is stored, and any standards used to format and display the video content stream.

Extraction of the metadata is significant because 1) the metadata can be used to format the video content stream from its original format (e.g., stored on the server) into a format that is compatible with the user device and/or the first party portal. Furthermore, 2) the descriptive details (e.g., title, authors) included in the metadata can be displayed on the user device for the user to view alongside the video content stream. The descriptive details can be used to inform the user what is currently being displayed on the user device.

These details can help the user determine if the video content stream being displayed is the correct one that the user would like to view.

Once the metadata has been extracted, information from the metadata is parsed by the user device in step in order to determine the significance of the extracted metadata. As noted above, the metadata may include information that is descriptive to the video content stream. Such information can be displayed for the user to view on the user device to inform the user what stream is currently being viewed. Furthermore, other information from the metadata can be used to format the stream to be compatible with the user device.

The descriptive information included in the metadata is then mapped in step 425. The first party portal may include multiple pre-established categories of information that are displayed on the user device alongside the video content stream. These pre-established categories are used to inform the user information about the stream being viewed. Such information may include the subject matter of the stream, the author(s) of the stream and titles associated with the stream. The metadata associated with the video content stream obtained from the third party content provider may categorize similar information (e.g., title, author, subject matter) differently. The mapping performed in step 425 recognizes that the information may be labeled differently for each third party content provider but aims to ensure that the information is referenced the same way on the user device via the first party portal.

The mapping used in step 425 may be generated, for example, by an administrator. The administrator may identify how each third party content provider may label related information for a particular video content stream. For example, the author of the stream may be identified by other content providers as broadcaster, streamer or merely as a user. This information may be labeled and stored differently based on the content provider. Regardless of how the third party content provider identifies, stores or labels this information about the video content stream, the mapping performed in step 425 ensures the information about the author is associated with the appropriate pre-established category of information used by the first party portal. In this way, this descriptive information is displayed on the user device for the user to view alongside the video content stream in a consistent manner.

In step 430, the first party portal formats the video content stream coming from the third party content provider. Formatting is determined based on the extracted metadata coming associated with the video content stream. If the video content stream is already in a format that is compatible with the user device, then no formatting may be needed. However, if the format identified in the extracted metadata is distinct from a format that is compatible with the user device, one or more aspects of the video content stream may need to be modified.

As known in the art, video content streams may have a particular video format. These video formats can dictate how the data is stored and/or how the video content is executed or displayed on user devices. The formatting, performed in step 430, may utilize known conversion software or techniques in order to facilitate the display of the video content stream specific for the user device. For example, the video content may be provided with a default resolution for a default display screen size. The video content can be modified in order to have a resolution and sizing that corresponds to the user device.

The first party portal service associated with the user device includes various instructions that are usable in facilitating the formatting of the video content stream from one format to the format specific to the user device. These instructions may be stored in a database, for example, on the user device or on the server associated with the first portal service. In situations where no instructions are available to convert an aspect of the video content stream, this may 1) trigger the server and/or user device to search one or more sources (e.g., the Internet) for any applicable instructions on how to convert the information into a format that is compatible with the user device, 2) overlook the issue and proceed with displaying the video content onto the user device (if able), or 3) providing notice to the user that one or more aspects of the video content stream cannot be formatted into a manner that is compatible with the user device thereby preventing the video content stream from being viewed on the user device.

Once the third party video content is formatted, the user device (via the first party portal) can proceed with displaying the content for the user to view in step 435. The displayed third party video content would include not only the video content stream but also related metadata extracted (in step 420) and mapped (in step 425). Exemplary metadata that could be displayed by default could include the author(s) of the video content stream and the title. More or less metadata may be customized, for example, by the user or first party portable, to be displayed alongside the video content stream.

In the embodiment described above (in step 405-step 435), a relationship between the user device, server and third party content provider is provided (see, FIG. 1A). In particular, the user device communicates with the server initially to obtain information about the third party content provider. Subsequently, the user device communicates with the third party content provider (based on the information obtained from the server) in order to retrieve the third party content video stream.

It is also possible that a different relationship between the user device, server and third party content provider is also implemented (see, FIG. 1B). In particular, the user device could still communicate with the server regarding the third party content that the user would be interested in viewing. However, instead of providing the information to the user device regarding where the third party content can be found on the Internet (e.g., step 410), the server can subsequently communicate with the third party content provider on the user device's behalf regarding the user view request. The third party content provider, using the information from the server, can initiate communication (i.e. establish a communication channel) with the user device associated with the user view request. The established communication is then used to deliver the requested third party content video stream to the user device for display on the user device.

To facilitate the illustration of how method 400 would implement the delivery of third party content, an example situation is provided below whereby a user is requesting to view a particular video content stream on a particular third party content provider website (e.g., Twitch). The video content stream will be delivered to the user device associated with the first party portal service that is provided support from a server associated with the first party portal service. It should be noted that other third party content providers can also be applicable here. For example, third party content from other existing (and future) third party content providers may also be implemented here. (e.g., Youtube, Vine).

Twitch may provide a variety of different streaming video content categorized under different genres, game titles or authors. Each of these genres and categories can further become broken down by any number of different characteristics such as particular subject matter of the video content, the author(s) of the video content, and popularity. Therefore, the amount of information that a user provides in a user request in step 405 can better identify the video content stream coincides with the user request.

The user request may be inputted via a user interface associated with the user device. The first party portal may include one or more entries associated with a search engine that would facilitate the search for the particular video content subject to the user request.

Using the user request, the computing device communicates with the server in order to identify that the video content stream that the user wishes to view is located on Twitch (via step 410). In one embodiment, the computing device can communicate with the server (associated with the first party portal service on the user device) in order to identify that the user request is associated with a stream from Twitch.tv. In another embodiment, such information may already be stored on the user device (provided at a previous time by the server). This information also includes where (i.e. web address on the Internet) that Twitch is located so that communications between the user device and Twitch can be established in order to retrieve the video content stream that will be displayed on the user device.

Once Twitch is identified as the source of the video content stream that the user would like to view, the user device can attempt to establish communication with the third party content provider in step 415. The communication channel established between the user device and Twitch would allow the user device to retrieve the video content stream (and related information) from Twitch.

In step 420, metadata associated with the video content stream can be extracted from the information being provided from Twitch to the user device via the communication channel. The metadata, which includes descriptive information about the video content stream as well as format-based information, can be extracted.

In step 425, the descriptive information obtained from the metadata (in step 420) can be mapped to pre-determined category of information that is displayed on the user device. These types of information may include, for example, the author(s) of the video content stream, the subject matter (i.e. game title) or the title of the stream. Such information will be displayed alongside the video content stream in order to inform the user what exactly the user is viewing on the user device.

In step 430, the user device uses the format-based information obtained from the metadata (in step 420) in order to format the video content stream to be compatible with the user device. The methods for formatting the video content stream can already be stored on the user device and executed as necessary. In some other embodiments, the user device may need to 1) communicate with the server or 2) search the Internet for the necessary methods (i.e. applications, software, instructions) used to format (e.g., convert) the video content stream into a form that is compatible with the user device.

Alongside the formatting of the video content stream so that the video content stream can be compatible with the user device, step 430 may also include formatting the video content stream so that the video content stream is compatible with the first party portal. In particular, the video content stream is formatted to resemble a "channel" similar to existing cable channels or video on demand content. With the formatting of the content as a channel, a variety of functionalities can be performed on the video content stream on the user device. Further details regarding these functionalities are provided below.

In step 435, the user is able to view the video content stream on the user device. The descriptive information extracted from the metadata may also be displayed. The amount of descriptive information, as well as what types of descriptive information, to be displayed alongside the video content stream can be customized by the user or based on the first party portal service.

Once the video content stream is provided on the user device for viewing, the first party portal service allows the user to perform a variety of different functionalities. For example, the first party portal service facilitates the user in saving (i.e. bookmarking) third party content streams. This feature of saving/bookmarking allows the user to store references to specific third party content streams in memory. The user is then able to recall these references as desired (e.g., flashback mode) without the need to search up the specific third party content stream again through the user interface (see step 405-410).

The first party portal service is also capable of retrieving a plurality of different third party content streams based on user view request. Each of these streams may be assigned a different channel thereby allowing the user to view (i.e. scan) multiple streams quickly and easily without the need to perform individual processes to select a stream to download, load up the stream for view and close the stream if the particular stream is not the one the user would like to view. This functionality would resemble a user scanning television channels on their television or searching through different programs on their streaming media service (e.g., Netflix). Since the third party content streams are available to the user device, via the first party portal service, the user is able to switch and view numerous different streams (each assigned to their own channel) more quickly and easily.

Furthermore, the first party portal service may include different channels that contain particular characteristics. These channels may be provided by default and are available for viewing upon initiation of the first party portal service. In other words, the user device may automatically be retrieving the content and making it available on the user device without a specific user request. For example, these channels may, for example, provide to the user the most popular stream at a current time from a particular content provider. These channels may also be more specific (based on user preference) with respect to a particular subject matter (i.e. game) or specific author (i.e. streamer). Although the availability of these channels may be constantly changing (i.e. the most popular stream may dynamically change over time), the streams associated with these channels may be fixed when the first party portal first initiates and updated whenever the user manually updates a request for these channels.

Other functionalities associated with the first party portal include the synchronization functionalities that may be present at the third party content provider that are also presented at the user device. For example, the first party portal may implement a chat service that parallels a chat functionality that the third party content provider includes with various third party content streams. These chat services may allow numerous viewers to simultaneously communicate with one another with the contents of the stream. Although the user, via the user device, is not directly interacting with the chat functionality on the third party content provider, the first party portal is able to synchronize the information on the chat interface on the user device with the chat service at the third party content provider. In this way, comments provided by other users on the third party content provider will appear on the user device as if these comments were directly provided to the user on the user device. Similarly, comments provided by the user on the user device will appear in the chat functionality on the third party content provider as if these comments were provided by the user directly to the third party content provider.

In fact, even after the transmission of the stream data to the user device, the user device and the third party content provider may constantly be in communication with each other to push information between the two (i.e. the client device and the third party content provider). For example, the user device may provide information about user views (e.g., viewing history, preferences) to the third party content provider. The third party content provider may push information (such as advertisements based on information related to user views) that may be displayed on the user device.

As described above, the implementation of the first party portal service with respect to the third party content, allows users the further ability to view a variety of different content all from a single interface. Users would not need to utilize multiple different applications or interfaces (e.g., browsers) in order to obtain content (e.g., third party content) to be viewed on their user device. The use of the first party portal serve, as described herein, increases efficiency and time savings associated with allowing the user to view all different types of content from a single interface. This efficiency and time savings is significant as the nature of digital content changes over time. In particular, the benefits of the invention will be seen as being significant because of the increasing amounts of available digital content for users to view and also the increasing of delivery speed of content.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed:

1. A method for integrating third-party content streams for viewing on a user device, the method comprising:
    receiving a request for information regarding a plurality of third-party content streams from a user device at a first party server, wherein the third-party content streams are hosted by one or more third parties;
    maintaining metadata at the first party server regarding the third-party content streams, wherein the metadata for each of the third-party content streams provides instructions for establishing a communication connection between the user device and a respective third-party hosting the associated third-party content stream;
    receiving an identification of at least one of the third-party content streams, the identification sent from the user device to the first party server;
    transmitting the metadata for the identified third-party content stream from the first party server to the user device, wherein the user device streams the identified third-party content stream from the third-party host of the identified third-party content stream based on the transmitted metadata;
    initiating a chat session that includes the user device at the first party server; and
    maintaining the chat session at the first party server, wherein the chat session at the first party server parallels a third-party chat session maintained at the third-party host by synchronizing chat information between the user device and the third-party host, wherein synchronizing the chat information comprises:
        retrieving communications from one or more other user devices participating in the third-party chat session at the third-party host,
        incorporating the retrieved third-party chat session communications into the chat session at the first party server, wherein the retrieved third-party chat information appears to be provided directly to the chat session in which user device is participating,
        tracking communications entered by the user device participating in the chat session at the first party server, and
        providing the tracked communications from the user device participating in the chat session at the first party server to the third-party host for incorporation into the third-party chat session.

2. The method of claim 1, further comprising parsing the metadata for the identified third-party content stream into a plurality of characterizations corresponding to descriptive data about the identified third-party content stream, wherein the descriptive data includes a third-party content stream title.

3. The method of claim 2, wherein the descriptive data further includes one or more authors of the identified third-party content stream.

4. The method of claim 2, further comprising mapping the characterizations of the identified third-party content stream in a first format to a reformatted version in a format native to the user device.

5. The method of claim 1, further comprising:
    receiving information corresponding to a number of viewers associated with the identified third-party content stream from the user device and one or more of the other user devices; and
    transmitting the information corresponding to the number of viewers to the third-party host.

6. The method of claim 1, further comprising incorporating advertisements with the identified third-party content stream.

7. The method of claim 6, wherein the incorporated advertisements are obtained from the third-party host.

8. The method of claim 1, further comprising assigning the identified third-party content stream to a channel, wherein the channel is selectable from among a plurality of other channels associated with other third-party content streams.

9. The method of claim 1, further comprising saving the information regarding the third-party content streams for future viewing, wherein the saved information regarding the third-party content streams is stored in a database.

10. The method of claim 1, wherein the received identification includes a query for the identified third-party content stream.

11. The method of claim 1, wherein the received identification includes a query for a highest number of current views.

12. A system for integrating third-party content streams for viewing on a user device, the system comprising:
a server in communication with one or more third-party host devices, wherein the third-party host devices host content that includes the third-party content streams, the server associated with a first party portal service, wherein the server:
receives a request for information regarding a plurality of third-party content streams from a user device, wherein the third-party content streams are hosted by one or more third-parties;
maintains metadata regarding the third-party content streams, wherein the metadata for each of the third-party content streams provides instructions for establishing a communication connection between the user device and a respective third-party host device hosting the associated third-party content stream,
receives an identification of at least one of the third-party content streams, the identification sent from the user device,
transmits the metadata for the identified third-party content stream to the user device,
initiates a chat session that includes the user device, and
maintains the chat session, wherein the chat session parallels a third-party chat session maintained at the third-party host device by synchronizing chat information between the user device and the third-party host device, wherein synchronizing the chat information comprises:
retrieving communications from one or more other user devices participating in the third-party chat session at the third-party host device,
incorporating the retrieved third-party chat session communications into the server chat session, wherein the retrieved third party chat information appears to be provided directly to the chat session in which the user device is participating,
tracking communications entered by the user device participating in the chat session, and
providing the tracked communications from the user device participating in the chat session to the third-party host for incorporation into the third-party chat session.

13. The system of claim 12, wherein the server further extracts third-party content stream metadata and parses the extracted metadata into a plurality of characterizations that correspond to descriptive information about the third-party content stream, wherein the descriptive data includes a third-party content stream title or authors of the third-party content stream.

14. The system of claim 12, wherein the server further:
receives information corresponding to a number of viewers associated with the displayed third-party content stream from the user device; and
transmits the information corresponding to the number of viewers to the third-party host device.

15. The system of claim 12, wherein the server further incorporates advertisements with the third-party content stream.

16. The system of claim 15, wherein the incorporated advertisements are obtained from the third-party host device.

17. The system of claim 12, wherein the server further assigns the third-party content stream a channel that is selectable via a user interface of the user device from a plurality of channels each having its own content.

18. The system of claim 12, wherein the server further saves the third-party content streams for future viewing, wherein the saved third-party content streams are stored in a database that can be recalled by the user.

19. A non-transitory computer-readable storage medium, having embodied thereon a program executable by a processor to perform a method for integrating third-party content streams for viewing on a user device, the method comprising:
receiving a request for information regarding a plurality of the third-party content streams from the user device at a first party server, wherein the third-party content streams are hosted by one or more third parties;
maintaining metadata at the first party server regarding the third-party content streams, wherein the metadata for each of the third-party content streams provides instructions for establishing a communication connection between the user device and a respective third-party hosting the associated third-party content stream;
receiving an identification of at least one of the third-party content streams, the identification sent from the user device to the server;
transmitting the metadata for the identified third-party content stream from the server to the user device, wherein the user device streams the identified third-party content stream from the third-party hosting the identified third-party content stream based on the transmitted metadata;
initiating a chat session that includes the user device at the first party server; and
maintaining the chat session at the first party server, wherein the chat session at the first party server parallels a third-party chat session maintained at the third-party host by synchronizing chat information between the user device and the third-party host, wherein synchronizing the chat information comprises:
retrieving communications from one or more other user devices participating in the third-party chat session at the third-party host,
incorporating the retrieved third-party chat session communications into the chat session at the first party server, wherein the retrieved third-party chat information appears to be provided directly to the chat session at the first party server in which the user device is participating,
tracking communications entered by the user device participating in the chat session at the first party server, and
providing the tracked communications from the user device participating in the chat session at the first party server to the third-party host for incorporation into the third-party chat session.

* * * * *